(12) United States Patent
Peteri

(10) Patent No.: US 9,022,243 B2
(45) Date of Patent: May 5, 2015

(54) VESSEL HAVING A HOSE COUPLING

(75) Inventor: Niels Theodoor Peteri, Rotterdam (NL)

(73) Assignee: Henri Peteri Beheer B.V., Ridderkerk (NL)

(*) Notice: Subject to any disclaimer, the term of this patent is extended or adjusted under 35 U.S.C. 154(b) by 664 days.

(21) Appl. No.: 13/131,627

(22) PCT Filed: Dec. 8, 2009

(86) PCT No.: PCT/NL2009/050747
§ 371 (c)(1),
(2), (4) Date: May 27, 2011

(87) PCT Pub. No.: WO2010/068098
PCT Pub. Date: Jun. 17, 2010

(65) Prior Publication Data
US 2011/0226790 A1   Sep. 22, 2011

(30) Foreign Application Priority Data

Dec. 8, 2008 (NL) ..................................... 2002302

(51) Int. Cl.
| | |
|---|---|
| B65D 41/04 | (2006.01) |
| F16L 19/02 | (2006.01) |
| F16L 19/028 | (2006.01) |
| F16L 33/01 | (2006.01) |
| F16L 41/14 | (2006.01) |
| F24H 9/12 | (2006.01) |

(52) U.S. Cl.
CPC ......... *F16L 19/0283* (2013.01); *F16L 19/0237* (2013.01); *F16L 19/0286* (2013.01); *F16L 33/01* (2013.01); *F16L 41/14* (2013.01); *F24H 9/124* (2013.01)

(58) Field of Classification Search
CPC ... F16L 19/0283; F16L 19/0237; F16L 33/01; F16L 41/14; F24L 19/0286; F24H 9/124

USPC ................ 285/363, 143.1, 137.11, 219, 220; 220/694, 592.01, 565, 661, 200, 657
See application file for complete search history.

(56) References Cited

U.S. PATENT DOCUMENTS

| | | | |
|---|---|---|---|
| 1,762,215 | A | 6/1930 | Dahlquist |
| 1,888,338 | A | 11/1932 | Weatherhead, Jr. |

(Continued)

FOREIGN PATENT DOCUMENTS

| | | |
|---|---|---|
| CN | 2077510 | 5/1991 |
| CN | 100398895 | 7/2008 |

(Continued)

OTHER PUBLICATIONS

Translation of DE 20014786 U1 (Hewing GmbH), Dec. 28, 2000, p. 1.*

(Continued)

*Primary Examiner* — Robert J Hicks
*Assistant Examiner* — Kareen Rush
(74) *Attorney, Agent, or Firm* — Steven M. Koehler; Westman, Champlin & Koehler, P.A.

(57) ABSTRACT

A vessel, preferably a pressure vessel, for containing water of a high temperature in an inner space thereof, which vessel comprises at least one passage. A first hose part, around which a first coupling part provided with a clamping surface extends, and a second coupling part formed around said passage, which is provided with a bearing surface, connect to the passage in the vessel. A second hose part extends from said passage into the inner space of the vessel. The first and the second coupling part are interconnected and the first and the second hose part are provided with flanged ends, which are clamped between the bearing surface and the clamping surface in the coupled condition of the two coupling parts, with the first and the second hose part forming a substantially continuous hose.

20 Claims, 4 Drawing Sheets

(56) References Cited

U.S. PATENT DOCUMENTS

| | | | |
|---|---|---|---|
| 2,613,958 A | 10/1952 | Richardson | |
| 3,319,980 A | 5/1967 | Demetriff et al. | |
| 3,343,565 A | 9/1967 | Johnson | |
| 4,236,736 A * | 12/1980 | Anderson | 285/125.1 |
| 4,964,394 A | 10/1990 | Threatt | |
| 5,378,023 A * | 1/1995 | Olbrich | 285/24 |
| 6,361,083 B1 * | 3/2002 | Riesselmann et al. | 285/333 |
| 7,185,921 B2 * | 3/2007 | Carhuff | 285/255 |
| 2008/0048440 A1 * | 2/2008 | Anderson et al. | 285/143.1 |
| 2008/0084032 A1 * | 4/2008 | Cravens | 277/609 |
| 2011/0315794 A1 * | 12/2011 | Albrecht | 239/547 |

FOREIGN PATENT DOCUMENTS

| | | |
|---|---|---|
| DE | 2747024 | 2/1979 |
| DE | 20014786 | 12/2000 |
| FR | 1158884 | 6/1958 |
| JP | 58-118383 | 8/1983 |
| JP | 63-115982 | 7/1988 |
| JP | 9-96391 A | 4/1997 |
| JP | 11-182753 A | 7/1999 |
| JP | 11-245929 A | 9/1999 |
| JP | 2002-310346 A | 10/2003 |
| WO | 00/63623 | 10/2000 |

OTHER PUBLICATIONS

Chinese Office Action, mailed Jan. 25, 2013 in connection with Chinese Patent Application No. 200980148471A.
International Search Report related to PCT/NL2009/050747 + Written opinion, mailed on Jun. 4, 2010.
Machine translation of the relevant parts of FR1158884.
Machine translation of the relevant parts of DE 2747024.
Machine translation of the relevant parts of DE 20014786.
Notification of Reasons(s) for Refusal for Japanese Patent Application No. 2011-539468, Drafting Date Nov. 8, 2013.

* cited by examiner

VESSEL HAVING A HOSE COUPLING

PRIORITY CLAIM TO RELATED APPLICATIONS

This application is a national stage application under 35 U.S.C. §371 of PCT/NL2009/050747, filed Dec. 8, 2009, published as WO 2010/068098 A1 on Jun. 17, 2010, and claiming priority to Dutch Application No. NL2002302, filed Dec. 8, 2008, which application and publication is incorporated herein by reference and made a part hereof in its entirety, and the benefit of priority of which is claimed herein.

SUMMARY

The invention relates to a vessel, preferably a pressure vessel, for containing water of a high temperature in an inner space thereof, which vessel comprises at least one passage and a first hose part connected to the passage in the vessel.

Such a vessel is known, for example from International patent application WO 00/63623. Said known vessel is provided with a cover, in which the passage is present. A metal pipe extends through the passage. The first hose connects to the cover of the vessel via the first coupling part, with the pipe being clamped down in the first hose part and the second hose part extending into the pipe. If the first hose part is used for supplying cold water, as in this case, said cold water will come into contact with the hot feed-through pipe, as a result of which the calcium dissolved in the water will precipitate in the form of scale. After all, the solubility of calcium in water will strongly decrease as a result of the contact with the hot metal. This leads to local precipitation of calcium in the feed-through pipe. This effect is enhanced even further by the constriction in the passage caused by the presence of the feed-through pipe that extends into the first hose part.

The object of the invention is to provide a vessel in which the above problems are eliminated or at least alleviated.

In order to accomplish that object, the invention provides a vessel, preferably a pressure vessel, for containing water of a high temperature, which vessel comprises at least one passage, a first hose part connected to the passage in the vessel, around which a first coupling part provided with a clamping surface extends, as well as a second coupling part formed around said passage, which is provided with a bearing surface, as well as a second hose part, which extends from said passage into the inner space of the vessel, said first and said second coupling part being interconnected and said first and said second hose part being provided with flanged ends, which is clamped between the bearing surface and the clamping surface in the coupled condition of the two coupling parts.

By extending the first and the second hose part towards each other, forming seal between them, a substantially continuous (plastic) pipe is provided, which covers the metal parts of the cover and which preferably continues without any constrictions present therein. In this way the causes of scaling are at least largely removed.

Preferably, the bearing surface and the clamping surface extend substantially parallel to each other at an angle different from 90° relative to the central axis of the passage, so that the strain relief of the first hose part is improved even further, in particular if the end of the second hose part is flanged less than 90°, and consequently the end of the first hose part is flanged more than 90°.

If the first hose part is made up of an inner tube of a hose comprising said inner tube and an outer sheath, preferably of a metal mesh, surrounding said inner tube, the invention can be realised if the inner tube extends beyond the outer sheath and can thus continue up to the clamping location between the bearing surface and the clamping surface.

It is advantageous in that regard if the first coupling part is provided with a, preferably metal, pipe-shaped portion, which is thin-walled and which is disposed between the inner tube and the outer sheath of the hose, being clamped to the outer sheath by means of a clamping element, which preferably surrounds the outer sheath. In this way the inner tube can extend through the first coupling part, and said coupling part can be connected to the hose in a simple manner by means of said pipe-shaped portion. Forming the first coupling part of a metal makes it possible to configure the pipe-shaped portion simply as a thin-walled yet sufficiently strong pipe part, whilst the use of the continuous, flanged inner tube obviates the need for additional measures for screening the water from the metal coupling part.

A further improvement of the vessel according to the invention is realised in that at least a part of the inner side of the vessel around the passage is lined with a separate plate of, for example, stainless steel, which plate is provided with a passage in line with the passage in the vessel, said plate being flanged, preferably more than 90°, at the location of the passage therein so as to form a flanged part such that the flanged part of the plate at least partially forms the bearing surface.

The use of said plate, which is preferably attached to the cover of the vessel, in combination with the first and possibly the second hose part makes it possible to prevent any contact of the hot water in the vessel with other parts of the cover. The cover can in that case be formed of a suitable metal or a suitable metal alloy, such as brass, aluminium or an iron alloy or the like, for example by means of a casting process, without any risk of the cover material being affected or disintegrating as a result of contact with the hot water. Additional seals for achieving the desired effect are not required.

It is also possible, of course, to use the plate without said special hose parts provided with flanged ends and to combine it with a passage which is otherwise provided with one or more hose parts. Thus, the first and the second hose part may be moved over the pipe-shaped ends of a first coupling part and be fixed thereto, with the first coupling part forming a seal against the flanged part of the plate either directly or through the use of an additional seal, for example in a comparable manner as at least the first hose part according to the invention.

BRIEF DESCRIPTION OF THE DRAWINGS

The invention will now be explained in more detail with reference to the drawing, which shows embodiments of the invention.

DETAILED DESCRIPTION

Figure 1:
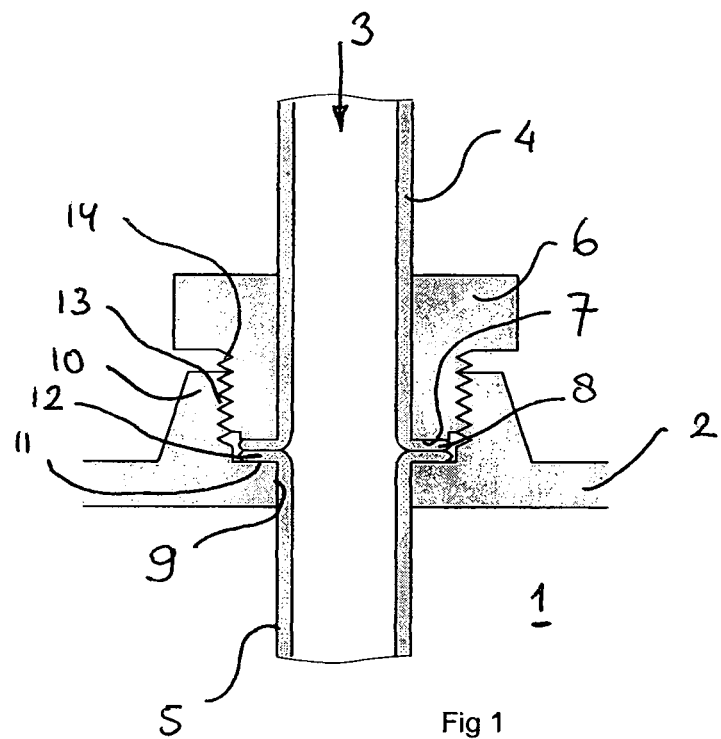
FIG. 1 is a very schematic longitudinal sectional view of part of a vessel according to the invention.

FIG. 1 shows a part of the vessel according to the invention. Said vessel may be made up of, for example, a pressure vessel for containing liquid, such as hot water, in particular of a temperature above the atmospheric boiling point of water, as disclosed in, for example, WO 00/63623, whose contents shall be considered to be incorporated herein by reference thereto. Such a vessel has an inner space 1 for containing hot water, which inner space is closed at the upper side by a cover 2, which may be connected, for example detachably, to the other part of the vessel (not shown). The vessel has an outlet for hot water (not shown), as well as an inlet 3 for allowing fresh water to flow into the vessel, which water can be heated in the vessel by a heating element (not shown). The water inlet 3 comprises a flexible first hose part 4, which extends from a water supply source to the cover 2 of the vessel, as well as a flexible second hose part 5, which extends from the cover 2 into the vessel, preferably to a position near the bottom thereof, where the heating element capable of heating the cold water is located, whilst the hot water is discharged from the vessel via the upper side thereof. The vessel is filled through the water inlet under pressure, so that hot water can at all times be discharged from the vessel from the upper side thereof.

As FIG. 1 shows, the two hose parts 4, 5 join in a contiguous manner, without any change in the internal diameter, whilst the hose parts 4, 5 completely and sealingly screen the surrounding parts of the cover, so that the water will only come into contact with the hose parts 4, 5 prior to entering the vessel.

This contiguous construction is achieved in that the first hose part 4 continues through a first coupling, part 6, which is provided with a clamping surface 7 at the end facing the vessel, with the first hose part 4 continuing beyond the coupling part 6 and being flanged at the clamping surface 7, as a result of which the flanged part 8 of the hose part 4 abuts against the clamping surface 7. The same is the case with the second hose part 5. Said hose part is passed through a passage 9, which is surrounded by a second coupling part 10, which coupling part is provided with a bearing surface 11 facing away from the vessel, against which a flanged end 12 of the second hose part 5 abuts. The first and the second coupling part 6, 10 can be moved into engagement with each other, in this case because the first coupling part is configured as a male part provided with external screw thread 13, whilst the second coupling part is the female coupling part, which is provided with internal screw thread 14, in which the external screw thread 13 of the first coupling part 6 fits.

FIG. 1 shows that the clamping surface 7 and the bearing surface 11 extend parallel to each other, at an angle of 90° relative to the central axis of the hose parts 4, 5, in the assembled condition. Upon insertion of the first coupling part 6 into the second coupling part 10, the clamping surface 7 moves in the direction of the bearing surface 11, and the flanged ends 8, 12 of the hose parts 4, 5 will be pressed together and be clamped between the clamping surface 7 and the bearing surface 11, such that a watertight seal is effected without the provision of an additional seal being required.

Figure 2:
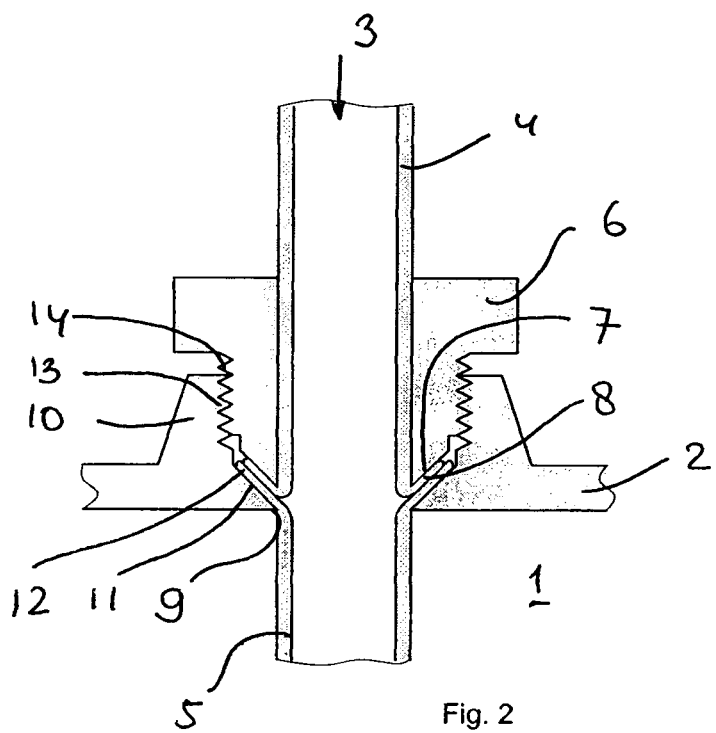
FIGS. 2-5 are sectional views corresponding to FIG. 1 of further embodiment is of the vessel according to the invention.

FIG. 2 shows a variant in which the clamping surface 7 and the bearing surface 11 do extend parallel to each other, albeit at an angle different from 90° relative to the central axis of the hose parts 4, 5. In this case the flanged end 12 of the second hose part 5 is flanged about 45°, and consequently the end 8 of the first hose part 4 is flanged about 135°. It is also possible, of course, for the clamping surface 7 and the bearing surface 11 not to extend parallel to each other, or to be shaped differently from each other (for example exhibiting a curvature in radial direction), as long as the clamping surface 7 and the bearing surface 11 can effect a clamping contact all around.

Figure 3:
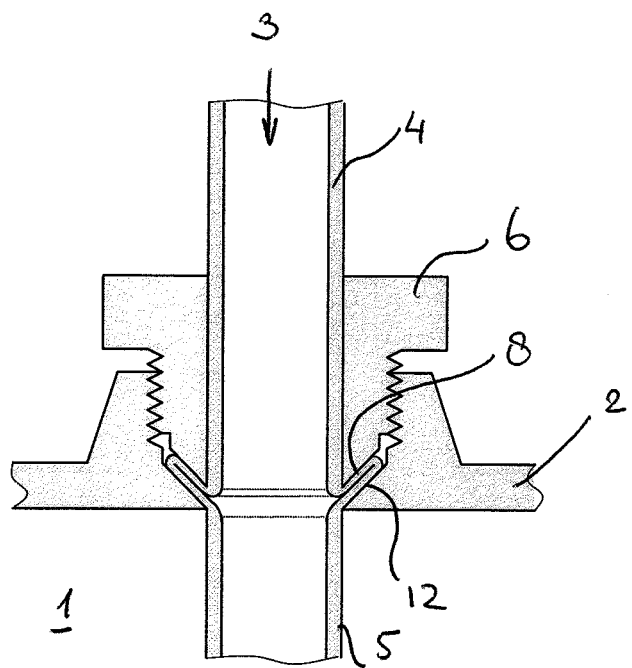

FIG. 3 shows another embodiment, in which the first and the second hose part 4, 5 are made of one length of hose, and consequently the flanged ends 8, 12 of the hose parts continue into one another. In this way the sealing of the hose parts 4, 5 is ensured and the flanged ends are mainly used for attaching the hose to the cover 2 of the vessel and thus function as strain relief means.

Figure 4:
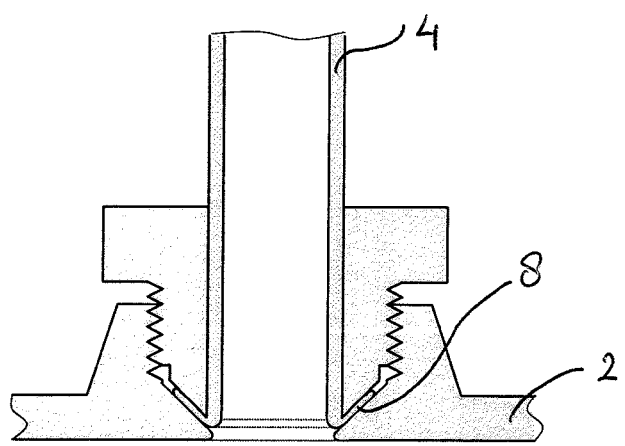

FIG. 4 shows yet another variant of the invention, in which only a first hose part 5 connects to the vessel, being fixed and sealed via the flanged end 8. Such an embodiment can be used if water or another fluid is to be supplied or discharged at the upper side of the vessel, for example as a hot water outlet in a pressure vessel. This embodiment can also be used, of course, if the fluid is to be supplied or discharged at another location, by having the first hose part connect to another part of the vessel, for example to the bottom or to a side wall.

Figure 5:
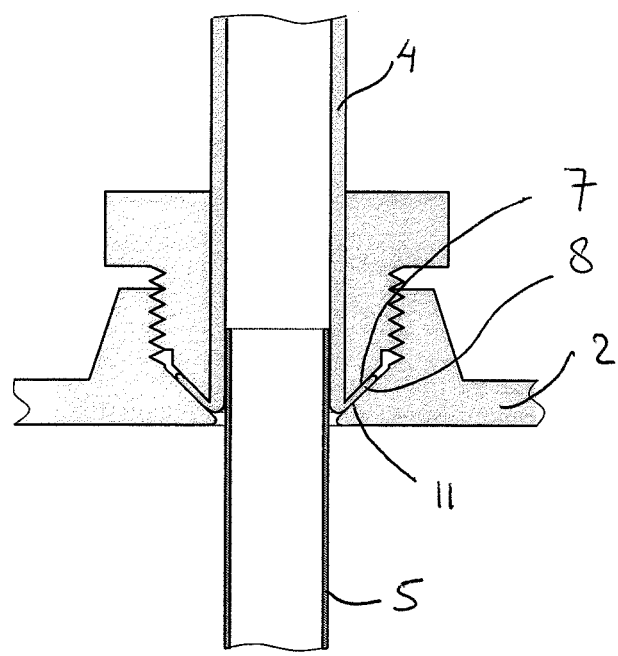

FIG. 5 elaborates on the embodiment of FIG. 4, in which only the first hose part 4 is fixed between the clamping surface 7 and the bearing surface 11 with the flanged end 8 thereof, and the second plastic (preferably a little more thin-walled) hose part 5 is connected to the first hose part in a different manner, for example by inserting it into the first hose part and securing it thereto, for example by clamping. The latter will take place automatically when the flanged end 8 of the first hose part is being clamped down, because this will cause the hose part 4 to bulge slightly inwards near the flanged end.

Figure 6:
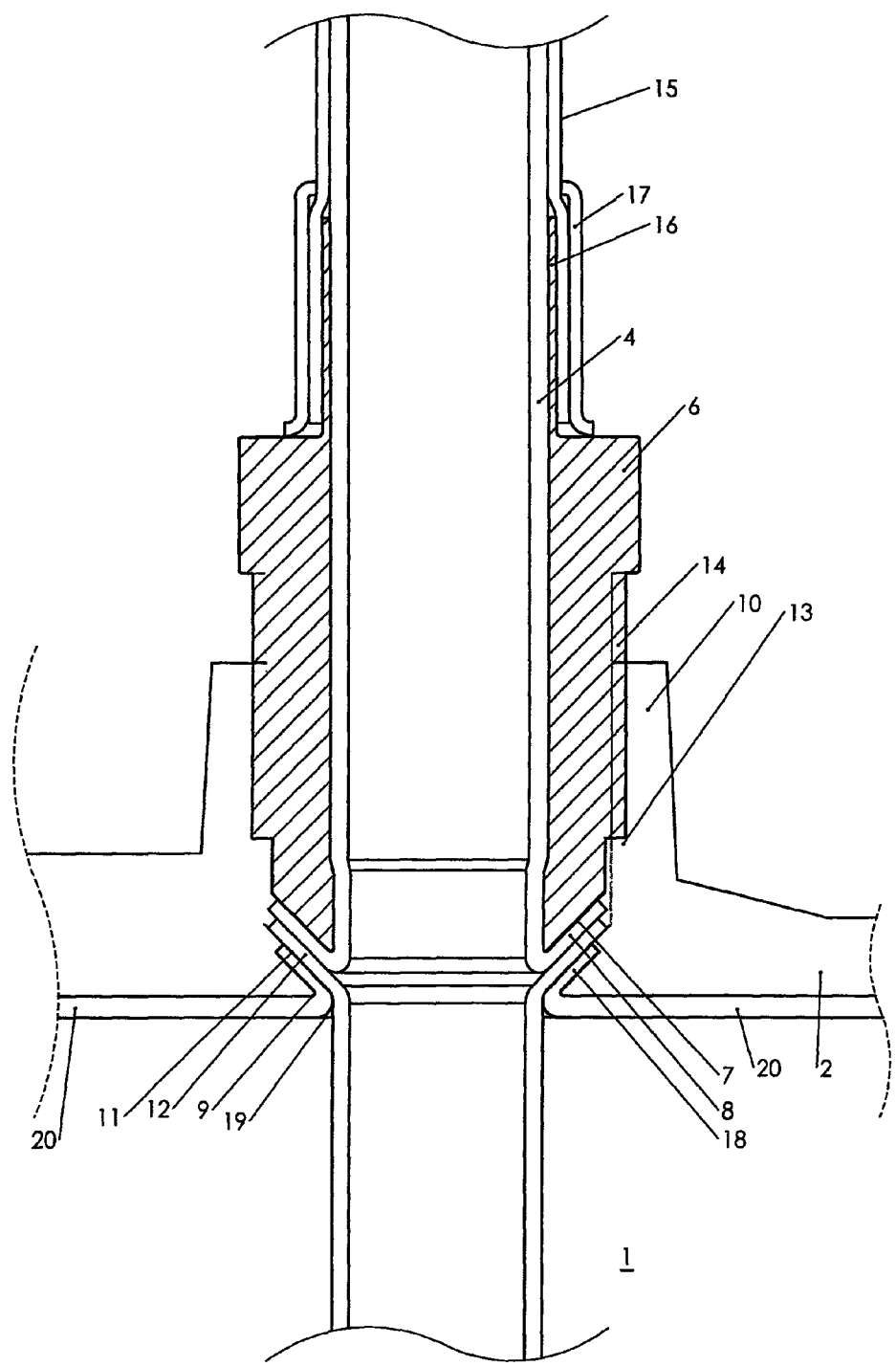
FIG. 6 is a large-scale longitudinal sectional view of yet another embodiment of the vessel according to the invention.

FIG. 6 shows a final embodiment in more detail. A first detail concerns the construction of the first hose part 4 and the associated coupling part 6. In this embodiment, the first hose part 4 is formed by the flexible inner tube of a hose, which is made of PTFE, for example, or of another suitable plastic material. The hose comprises said inner tube 4 and a sheath 15 surrounding said inner tube, which is preferably formed of a metal mesh or the like. The above hoses are hoses which are known per se in the art.

In this case the inner tube 4 is longer than the sheath 15, so that the inner tube 4 projects beyond the sheath 15, viz. through the coupling part 6 up to the clamping surface 7 thereof. The coupling part 6 comprises a thin pipe-shaped portion 16, which is inserted between the inner tube 4 and the sheath 15, with a clamping sleeve 17 clamping the sheath 15 down on the pipe-shaped portion 16 of the coupling part 6, thus forming a connection between the coupling part 6 and the hose. In this way a connection is realised using few parts, whilst the internal diameter of the hose does not exhibit any staggered portions.

A second detail that can be distinguished in FIG. 6 is that the bearing surface 11 of the cover 2 is largely made up of a bent-over, ring-shaped flange or flanged part 18 surrounding an opening 19 in a plate 20. Said plate 20 is preferably made of stainless steel and functions to cover the rest of the cover, which is thick-walled so as to be able to withstand the liquid pressure and which is consequently formed of a suitable metal, such as aluminium, brass or an iron alloy, for example by means of a casting process. The cover material is thus preserved from corrosion or other forms of attack. Having the plate 20 continue in upward direction beyond the opening 19 so as to form the bearing surface 11 for the hose parts 4, 5 achieves that also here the flanged ends 8, 12 of the hose parts 4, 5 can provide the seal between the plate 20 and the cover 2, so that an additional seal need not be provided. Selecting an angle of less than 90° between the bearing surface 11 and the central axis of the first hose part (i.e. flanging the bearing surface 11 more than 90° but less than 180°) makes it possible to bend over the flange 18 in a pressing operation without the risk of cracks forming in the plate material.

The invention as described in the foregoing provides a vessel that offers various advantages over the prior art:
   as a result of the use of a continuous plastic conduit there will no longer be any contact between water and metal parts of the vessel and/or coupling parts, and precipitation of calcium or other interaction with the metal can no longer take place, as a result of said reduced precipitation of calcium, the through-flow in the conduit will remain optimal and attack of metal parts, for example caused by dezincification or corrosion, can no longer take place, the water cannot become contaminated by released metals or metal oxides, there will no longer be a constriction in the conduit at the location of the connection of the hose to the vessel, which also contributes to a proper through-flow, the connection according to the invention is simpler and cheaper in construction than a conventional connection, where an additional steel coupling pipe between the first hose part and the cover is required for connecting the first hose part and possibly the second hose part.

The invention is not limited to the embodiments as shown in the drawing and described in the foregoing, which can be varied in several ways within the scope of the invention. Thus, the first hose part 4 could also connect to another part of the vessel, for example the bottom, in which case a second hose part is not needed for having the cold water flow into the vessel at the bottom thereof.

The female coupling part may be integrated in the cover of be configured as a separate part which is attached to the cover, for example by clamping, welding or the like. The invention may furthermore also be used with vessels for other liquids. Aspects of different embodiments may be combined. Thus it is possible, for example, to use the plate 20 from the version shown in FIG. 6 with the vessel of FIG. 4. In practice it is possible to use the connections of FIGS. 4 and 6 in one vessel, the connection of FIG. 6 for the cold water inlet and the connection of FIG. 4 for the hot water outlet.

The invention claimed is:

1. A vessel, for containing water of a high temperature in an inner space thereof, which vessel includes a vessel wall comprising:
    at least one passage,
    a first hose part connected to the passage in the vessel, around which a first coupling part provided with a clamping surface extends,
    a second coupling part formed around said passage as part of the vessel wall, which is provided with a bearing surface, and
    a second hose part, which extends beyond the second coupling part from said passage into the inner space of the vessel, wherein said first and said second coupling part are interconnected and said first and said second hose part are provided with flanged ends, which are clamped between the bearing surface and the clamping surface in a coupled condition of the two coupling parts, with the first and the second hose part forming a substantially continuous hose.

2. The vessel according to claim 1, wherein the bearing surface and the clamping surface extend substantially parallel to each other at an angle different from 90° relative to the central axis of the passage, such that the end of the first hose part is flanged more than 90°.

3. The vessel according to claim 1, wherein the first coupling part is a male coupling part and the second coupling part is a female coupling part, which are connected by means of screw thread.

4. The vessel according to claim 1, wherein the first hose part is designed for being connected to a cold water conduit.

5. The vessel according to claim 1, wherein the first hose part is made up of an inner tube of a hose comprising said inner tube and an outer sheath, surrounding said inner tube, said inner tube extending beyond said outer sheath.

6. The vessel according to claim 5, wherein the first coupling part is provided with a pipe-shaped portion, which is thin-walled and which is disposed between the inner tube and the outer sheath of the hose, and which is clamped to the outer sheath by means of a clamping element, which surrounds the outer sheath.

7. The vessel according to claim 1, wherein the inner side of the vessel, at least a part thereof that surrounds the passage, is lined with a separate plate, which plate is provided with an opening in line with the passage in the vessel, said plate being flanged, at the location of the opening so as to form a flanged part, such that the flanged part of the plate at least partially forms the bearing surface.

8. The vessel according to claim 7, wherein said plate is made of stainless steel.

9. The vessel according to claim 1, wherein the first and the second hose part are made of polytetrafluoroethylene.

10. The vessel according claim 1, wherein the passage is formed in a cover of the vessel forming the vessel wall.

11. The vessel of claim 1, wherein the second hose part is separate from the second coupling part.

12. A vessel, for containing water of a high temperature in an inner space thereof, which vessel comprises:
    at least one passage,
    a first hose part connected to the passage in the vessel, around which a first coupling part provided with a clamping surface extends, as well as a second coupling part surrounding said passage, which is provided with a bearing surface, wherein said first and said second coupling part are interconnected and said first hose part is provided with a flanged end, which is clamped between the bearing surface and the clamping surface in a coupled condition of the two coupling parts, the bearing surface and the clamping surface extending substantially parallel to each other at an angle different from 90° relative to the central axis of the passage, such that the end of the first hose part is flanged more than 90° in its clamped position.

13. The vessel according to claim 12, comprising a second hose part which extends from the passage into the inner space of the vessel and connects to the first hose part.

14. The vessel according to claim 13, wherein the second hose part is provided with a flanged end, and wherein the abutting flanged edges of the two hose parts are clamped between the bearing surface and the clamping surface in the coupled condition of the two coupling parts, and said first and said second hose part form a substantially continuous hose.

15. The vessel of claim 13, wherein the second hose part is separate from the second coupling part.

16. A vessel, for containing water of a high temperature in an inner space thereof, which vessel comprises:
    a cover provided with at least one passage, into which a first flexible hose part is passed, wherein the inner side of said cover, at least a part thereof around the passage, is lined with a separate plate, which covers the cover from the interior of the vessel and is provided with an opening in line with the passage in the cover, and wherein said plate is flanged, at the location of said opening so as to form a flanged part, such that the hose part is sealed relative to the flanged part of the plate;
    a first coupling part provided with a clamping surface; and
    a second coupling part surrounding said passage, which is provided with a bearing surface, wherein said first and said second coupling parts are interconnected and wherein the flanged part of the plate at least partially forms the bearing surface of the second coupling part and sealingly abuts against the clamping surface.

17. The vessel according to claim 16, wherein the first hose part is provided with a flanged end, which is clamped between the bearing surface and the clamping surface in the coupled condition of the two coupling parts, and which functions as a seal therebetween.

18. The vessel according to claim 16, wherein said plate is flanged more than 90° at the location of said opening.

19. The vessel according to claim 16, wherein the hose part is sealed directly against said flanged part.

20. The vessel according to claim 16, wherein the second coupling part sealingly abuts against the clamping surface with the interposition of a seal.

* * * * *